May 17, 1960 — R. EMANUEL — 2,936,770
VEHICLE WASHING PLANT
Filed Aug. 22, 1956 — 4 Sheets-Sheet 1

May 17, 1960  R. EMANUEL  2,936,770
VEHICLE WASHING PLANT
Filed Aug. 22, 1956  4 Sheets-Sheet 2
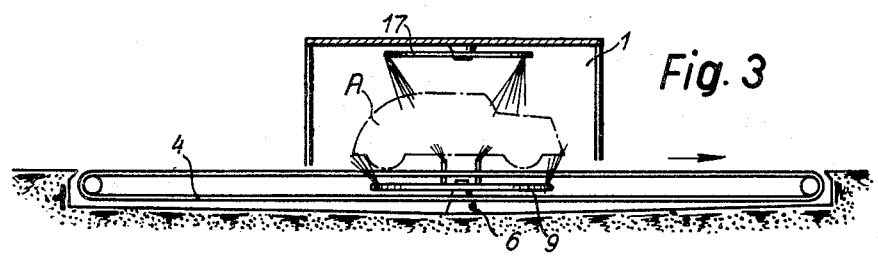
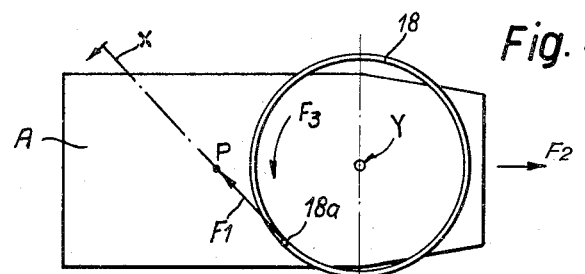
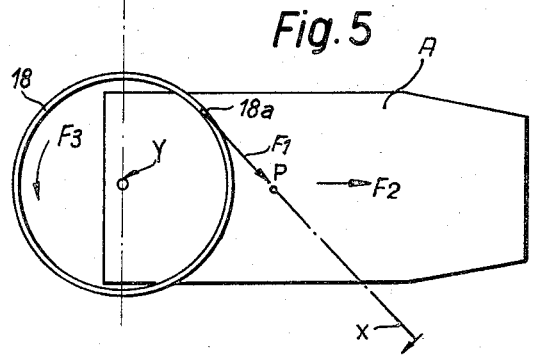
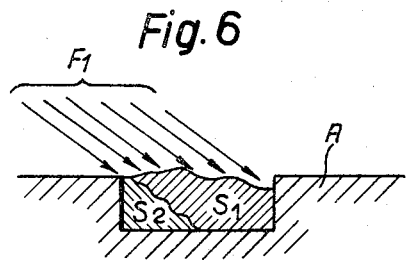
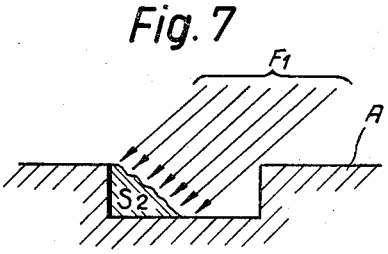

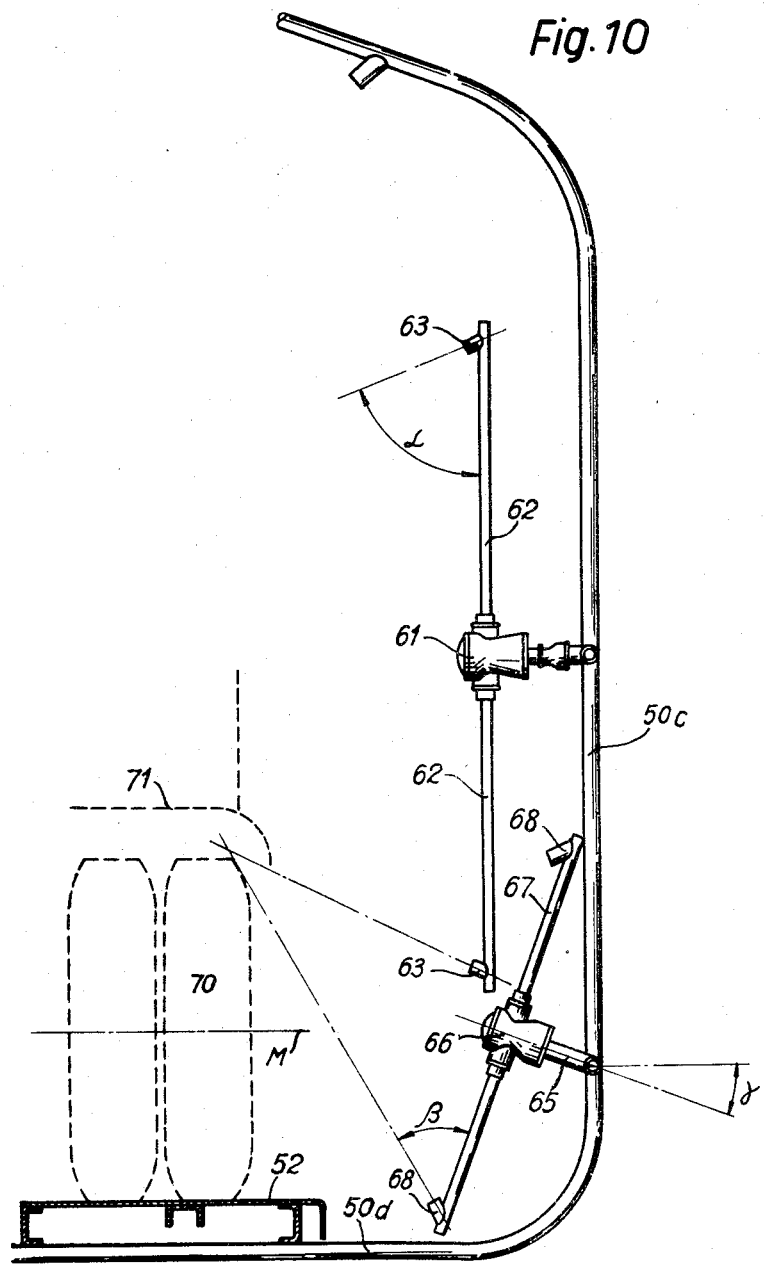

United States Patent Office 2,936,770
Patented May 17, 1960

2,936,770

VEHICLE WASHING PLANT

Roberto Emanuel, Turin, Italy

Application August 22, 1956, Serial No. 605,669

Claims priority, application Italy October 22, 1949

7 Claims. (Cl. 134—123)

This invention relates to vehicle washing plants, more particularly motor bus washing plants, of the type comprising a washing tunnel and spraying nozzles therein, whereby water can be sprayed on all outer surfaces of a vehicle moving longitudinally through the tunnel.

A first object of this invention is to provide in a plant of this type a novel arrangement of the spraying nozzles so as to thoroughly and rapidly wash the vehicle with a minimum power and water consumption.

A second object of this invention is to provide in a plant of this type an arrangement of movable spraying nozzles which does not require special mechanical, electric or other actuating means, and in which a dynamic action of the water by which said nozzles are fed performs actuation of the nozzles.

A further object of this invention is to provide in a plant of this type an arrangement of spraying nozzles which is more particularly advantageous for rapidly and economically eliminating muddy deposits and the like from those external surfaces of the vehicle body which are more particularly subject to accumulations of mud and dirt generally, such as the inside of the wings, as well as from those external surfaces which may be screened by certain protruding vehicle parts, such as door grips, bumper ends bent along the longitudinal side walls of the vehicle body and the like.

In my practice in the field of vehicle washing plants I have ascertained that plants known heretofore require a considerable expenditure of power and water, full elimination of certain muddy deposits from the body vehicle is very time-consuming and, generally, the water jets issuing from the nozzles are uncapable of directly impinging upon certain body regions. The washing action in said plants is therefore largely effected by the flow of large water volumes over the external vehicle surfaces, while it would be preferable for each region of said surfaces to be directly impinged upon by water jets, so as to utilise the action of the shock by the jets against muddy deposits in order to quickly break and remove said deposits.

I further ascertained that dirt deposits are more quickly eliminated if they are alternately impinged upon by water jets from two different, preferably opposite directions, whereby one jet effects on the deposit a digging action on one side, whereupon the other jet from a substantially opposite direction causes the still adhering deposit to fall-down and break, and washes it off.

However, the provision of a large number of spraying nozzles directed in opposite directions would involve a considerable complication of the plant and a disproportioned water and power consumption. In order to obviate this drawback and fulfill all the purposes mentioned above, I arrange in the tunnel several sets of nozzles rotatable in planes parallel with the direction of movement of the vehicle, each of the sets including propulsory nozzles inclined to the plane of rotation in a manner that the reaction effect of the water jets produced therefrom is utilised for rotating the set.

More particularly, I provide an automobile washing plant comprising a tunnel, longitudinal guides in the tunnel for the vehicle to be washed, hydraulic-jet rotatable nozzle sets arranged in said tunnel and rotatable in planes parallel with the direction of movement of the vehicle, the nozzles of said hydraulic-jet rotatable nozzles sets being directed towards the vehicle walls, and means for effecting a relative translation movement of the vehicle and said hydraulic-jet rotatable nozzle sets.

According to a preferred embodiment, each rotatable nozzle set is of the type comprising a tubular annulus supplied with water under pressure through tubular radial conduits leading to a central hub connected with a pressure water piping, the annulus and radial conduits being provided with nozzles adapted to direct water jets against the vehicle walls.

According to a further aspect of this invention I provide a vehicle washing plant comprising a tunnel, a U-shaped guide for wheels situated on one side of the vehicle, a guide in the form of metal plate for the wheels situated on the other side of the vehicle, the metal plate and the bottom of the U-shaped guide being arranged in the same horizontal plane spaced from the floor of the tunnel, a chain conveyor parallel with the U-shaped guide for advancing the vehicle within the tunnel, a hydraulic-jet rotatable nozzle set arranged in a horizontal plane under the first mentioned horizontal plane and rotatably mounted on projection of the floor, a hydraulic-jet rotatable nozzle set rotatably mounted at least on one side wall of the tunnel, a third hydraulic-jet rotatable nozzle set rotatably mounted on the ceiling of the tunnel, the nozzles of the rotatable nozzle sets being directed towards the adjacent vehicle walls, and a discharge conduit in the floor of the tunnel for discharging the washing water.

According to a further aspect of this invention I provide a vehicle washing plant comprising an open-ended tunnel, longitudinal tracks in said tunnel for supporting vehicles to be washed, means for effecting relative longitudinal movement of said tunnel and a vehicle supported by said tracks, a plurality of rotatable nozzle carriers disposed in said tunnel adjacent the tunnel walls, nozzles carried by said carriers and directed inwardly toward the axis of said tunnel, means for supplying water under pressure to said nozzles, at least some of said nozzles being inclined to exert a reaction force for rotating said carriers, said carriers being rotatable in fixed planes parallel to the axis of said tunnel and including a carrier rotatable in a vertical plane and a carrier rotatable in a horizontal plane, the relative movement of said tunnel and vehicle cooperating with the concurrent rotation of said carriers to subject surfaces of said vehicle to jets of water inclined towards said surfaces first in one direction and then in another.

According to a further aspect of this invention, I provide a vehicle washing plant comprising an openended tunnel, longitudinal tracks in said tunnel for supporting vehicles to be washed, means for effecting relative longitudinal movement of said tunnel and a vehicle supported by said tracks, a plurality of rotatable nozzle carriers disposed in said tunnel adjacent the side and top walls thereof, nozzles carried by said carriers at different distances from their centers and directed inwardly toward the axis of said tunnel, means for supplying water under pressure to said nozzles, at least some of said nozzles being inclined to exert a reaction force for rotating said carriers, said carriers being rotatable in fixed planes perpendicular to one another and parallel to the axis of the tunnel, the relative movement of said tunnel and vehicle cooperating with the concurrent rotation of said carriers to subject surfaces of said vehicle to jets of water inclined toward said surfaces first in one direction and then in another.

According to a still further aspect of this invention, I provide a vehicle washing plant comprising an openended tunnel, longitudinal tracks in said tunnel for supporting vehicles to be washed, means for effecting relative longitudinal movement of said tunnel and a vehicle supported by said tracks, a plurality of rotatable nozzle carriers disposed in said tunnel at the sides, top and bottom thereof, said side carriers being rotatable in fixed verticle planes parallel to the longitudinal axis of said tunnel, said top and bottom carriers being rotatable in fixed horizontal planes parallel to the longitudinal axis of the tunnel, said rotatable bottom carrier extending out under said tracks, nozzles carried by said carriers at different distances from their centers and directed inwardly toward the axis of said tunnel, means for supplying water under pressure to said nozzles, at least some of said nozzles being inclined to exert a reaction force for rotating said carriers, the relative movement of said tunnel and vehicle cooperating with the concurrent rotation of said carriers to subject the surfaces of said vehicle to jets of water inclined toward said surfaces first in one direction and then in another.

Other features and advantages of the invention will appear from following description taken in connection with the drawing wherein:

Figure 3 is a longitudinal cross-section of the plant according to Figures 1 and 2 on a reduced scale;

Figures 4 through 7 show the manner of operation of the rotatable nozzle sets in respect of a mud deposit in a depression in the surface of the vehicle body;

Figure 10 is a view on an enlarged scale of part of Figure 8.

Figure 1:
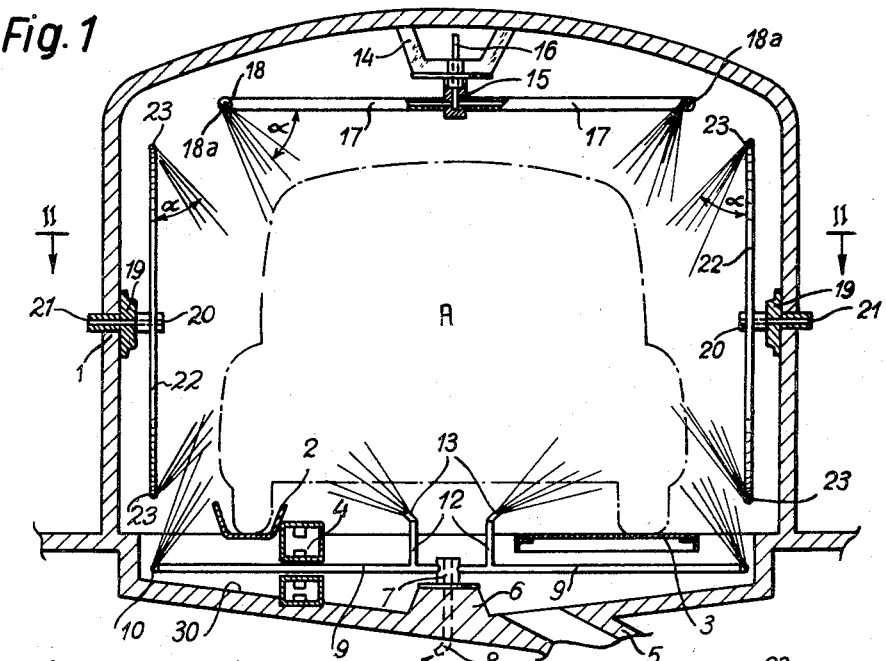
Figure 1 is a transverse cross-section of a washing plant according to this invention.
Figure 2:
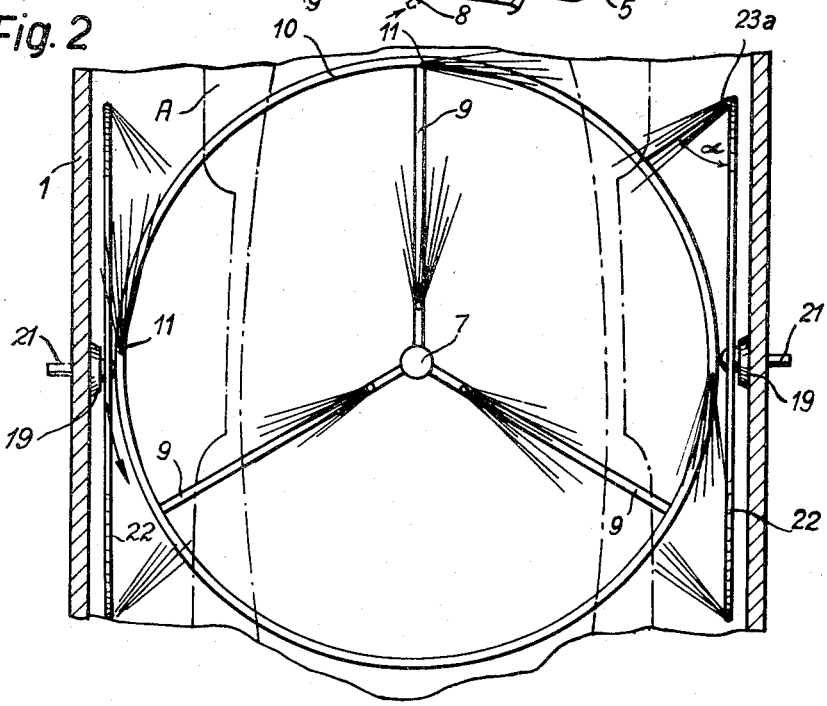
Figure 2 is a cross-section on line II—II of Figure 1.

Referring to the example shown in Figures 1 to 3, 1 denotes the washing tunnel carrying a U-guide 2 for two side wheels of a car A, of which the two wheels on the other side rest on a plane 3. The displacement of the vehicle A within the tunnel is effected by means of a chain conveyor 4, which is connected to a part of the car frame.

The central portion of the bottom 30 of the tunnel 1 is provided with a conduit 5 for discharging water and a projection 6 in which a hub 7 is rotatably mounted, and fed with pressure water through a conduit 8. The hub 7 is connected by means of radial conduits 9 to a tubular annulus 10, provided along its periphery with nozzles 11 for delivery of pressure water. The arrangement of the nozzles is such as to rotate the annulus 10 by reaction.

Vertical conduits 12 are branched from the radial conduits 9 and lead to nozzles 13 adapted to wash the bottom part of the car.

The ceiling of the tunnel 1 is provided at its central part with a depending support 14 in which a hub 15 is rotatably mounted and is fed with pressure water by a conduit 16. The hub 15 is connected by means of radial conduits 17 to a tubular annulus 18 provided with nozzles 18a adapted to wash the roof and side car walls and arranged to automatically rotate the annulus by reaction.

The two above described devices are sufficient for thoroughly washing the car when it is moved within the tunnel 1 by means of the conveyer 4. However, in special cases, further nozzle sets of a similar type may be arranged at the tunnel side walls. Figures 1 and 2 show by way of example a support 19 in which a hub 20 is rotatable and fed through a conduit 21 with pressure water, and from which spokes 22 lead to an annulus 23 provided with nozzles 23a for the delivery of pressure water and simultaneous rotation of the annulus.

As will be appreciated from Figures 1–3, the rotatable nozzle sets, such as 15, 17, 18, 18a; 7, 9, 10, 12, 13; and 20, 22, 23 are each rotatable in a plane parallel with the direction of movement of the vehicle A. In Figure 1 both the planes of rotation and direction of movement of the vehicle are perpendicular to the plane of the drawing.

The bottom of the U-shaped guide 2 and the metal plate 3 are arranged on a common horizontal plane spaced from the floor 30 of the tunnel, the chain conveyor 4 extending parallel with the guide 2. The rotatable nozzle set 7, 9, 10 rotates in a horizontal plane parallel with and positioned below the said common plane, the axis of the hub 7 being vertical. All the nozzles 10, 13, 18a and 23 are directed towards the adjacent surfaces of the vehicle, certain of said nozzles, such as those indicated by 11 in Figure 2 for the nozzle set 7, 9, 10 being inclined in a direction having a peripheral component, so that the water jets from said nozzles besides being directed towards the adjacent vehicle surface exert a dynamic action which induces rotation of the rotatable set.

It should be noted that the advantageous washing effect deriving from this nozzle arrangement would be fully unsatisfactory if the vehicle should stand still in the tunnel during washing. It is therefore essential for the purposes of this invention for the rotatable sets of nozzles to be associated with means for effecting a relative translation of the vehicle and tunnel, such as, for instance, the chain conveyor 4 in order to meet the requirements described hereafter with reference to Figures 4 to 7.

Let us assume 18a denotes on the said figures a nozzle carried by the tubular annulus 18 which rotates in the direction of the arrow F3 about the axis Y perpendicular to the plane of the drawing. The water jet issuing from the nozzle 18a is designated by F1. In the position shown in Figure 4, the jet F1 impinges upon the point P on the car body A. It is admissible to assume that the car body A is recessed at the point P as shown in Figure 6 in a cross sectional view on line X of Figure 4, and this shallow region is filled with dirt which should be washed away. Since the jet F1 (Figure 6) is inclined with respect to the surface of the car A in the manner shown, the part S1 only will obviously be impinged upon by the jet and washed away, while the portion S2 will remain unaffected. Probably, after a relatively long time, the portion S2 also will be removed from the surface of the car A, but this is not at all sure and implies a disproportionate water consumption.

Let us now assume the car A to be moved in the direction of the arrow F2, while the nozzle set 18, 18a quickly rotates about Y in the direction F3. Then the point P will be impinged upon by the jet F1 a first time in the position visible in Figure 4, with the effect illustrated with reference to Figure 6. After a certain time the vehicle has moved to the position shown in Figure 5, in which the point P is impinged upon by the same jet F1 for the second time, but in a reverse direction. This condition is shown in Figure 7, which is a cross section on line X of Figure 5. It will be seen from Figure 7 that the portion S2 of the dirt deposit is this time directly acted upon by the jet F1 and therefore washed away. This is no doubt an advantageous effect, which derives from the combination of the movement of rotation of the nozzles with the relative translational movement between the vehicle and rotary set of nozzles. It is therefore immaterial to the invention whether the vehicle moves within the tunnel or the vehicle is stationary and the sets of nozzles are rotatable and displaceable within the tunnel.

A similar analysis can be made with reference to the bottom and lateral sets of nozzles, possibly assuming a certain region of the vehicle surface to be screened for instance by a door grip or the like. It will then be seen that the described nozzle arrangement causes this region to be impinged upon in any case directly at least once by the water jet issuing from one and the same nozzle. It will further be understood that in this arrangement one nozzle performs the function of at least two nozzles in known constructions, which affords a considerable advantage under the aspect of water consumption.

I ascertained through comparative tests of my improved plant and a known plant comprising swinging nozzles that my improved plant is capable of thoroughly washing a relatively mud-soiled vehicle in four minutes and-a-half with a water consumption of 682 liters and a power consumption of 1.13 H.P./hr. while, in order to reach the same effect, the consumption in the known plant was 1.612 liters water, 3.1 H.P./hr. power and 7 minutes 20 seconds time.

I further ascertained that these results could be improved by adopting, instead of the arrangement of the nozzle sets shown in Figures 1, 2 and 3, the arrangement shown in Figures 8, 9 and 10 which will be described hereafter. It should more particularly be noted that these Figures 8–10 merely indicate the relative position of the various nozzle sets and certain angular relations, but it is understood that these sets are a part of a plant like the one shown in Figures 1–3; that is, a plant comprising a tunnel 1, longitudinal guides and means for moving a vehicle along the tunnel.

Figure 8:
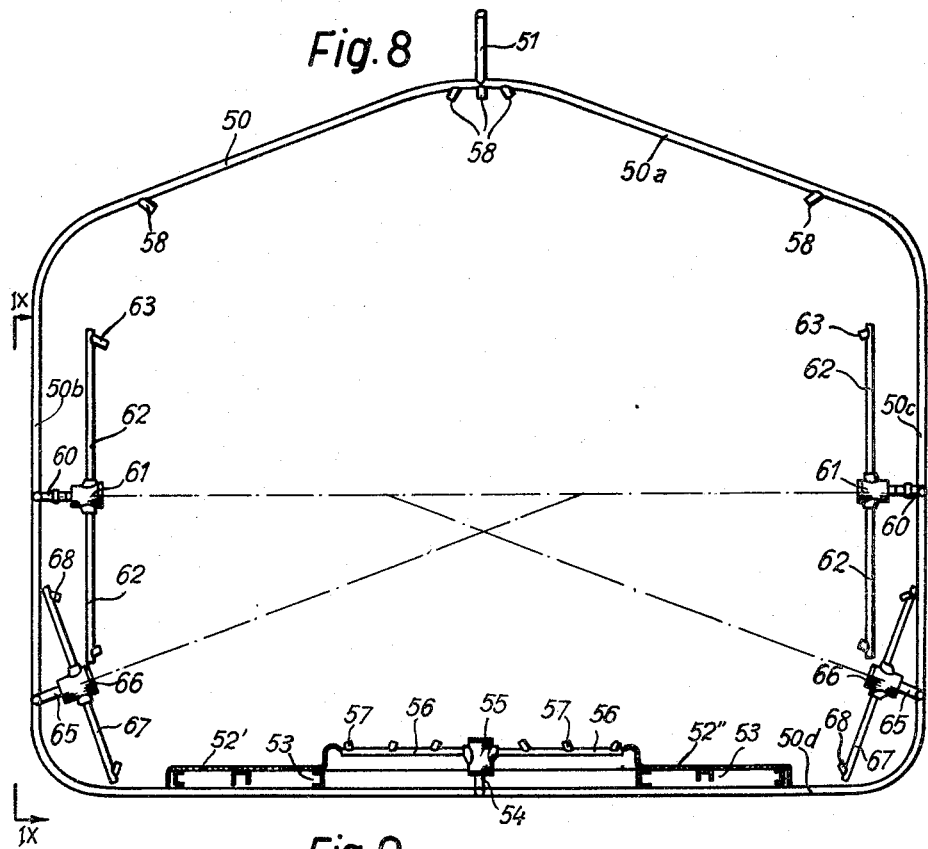
Figure 8 is a cross-sectional view of a further construction.
Figure 9:
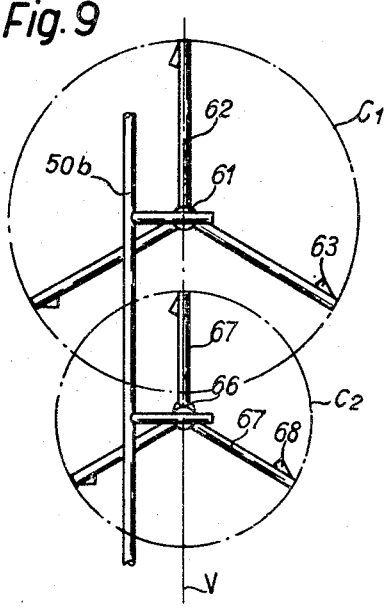
Figure 9 is a part diagrammatic view in the direction IX—IX of Figure 8.

In Figures 8–10, a tubular frame 50 is shown circumscribing the cross sectional area of the vehicle path along the tunnel. It will be understood that the external walls confining the tunnel are perpendicular to the plane of Figure 8 and circumscribe in turn the tubular frame 50. The tube forming the tubular frame 50 is fed with pressure water through a connecting pipe 51 extending from the frame top. Moreover, it will be easily seen from Figure 8 that the frame 50 is made up of four sections, namely, a roof section 50a extending crosswise of the tunnel, lateral sections 50b and 50c each merging into one end of the roof section 50a and extending vertically within the tunnel laterally of the vehicle path, and a bottom section 50d interconnecting the lower ends of the lateral sections 50b and 50c. The bottom section 50d has superposed thereon two longitudinal guides 52′ and 52″ made of sheet steel supported and stiffened by means of steel beams for instance of channel-shape 53. These two guides are parallel and transversely spaced by a suitable extent so that in use the wheels of a vehicle can roll on said guides. Since the plant being described with reference to Figures 8–10 is more particularly suitable for washing motorbusses which are nowadays of standard width, the transverse spacing of both guides will be readily determined.

An upright connecting pipe 54 extends upward from the middle of the bottom section 50d and has rotatably mounted thereon a hub 55. The hub 55 is hollow and connects with radial tubular arms 56 supported thereby. The arms 56 are each provided with a plurality of nozzles 57 distributed over its length, said nozzles being inclined so that the direction of at least certain nozzles have radial and peripheral components, the latter being all directed in the same sense, so that in use the water jets issuing from said nozzles induce through a reaction effect rotation of the hub 55 together with its arms 56. It will be understood that all the nozzles are upwardly directed, so as to impinge by their jets upon the vehicle bottom portion. The elements 55—57 thus form a rotatable nozzle set, the plane of rotation of which extends horizontally parallel with the plane of the guides 52′, 52″, its diameter being somewhat smaller than the spacing between the inner edges of the guides.

Considering that the least soiled vehicle portion is generally the vehicle roof, in the embodiment being described the roof is washed by means of stationary nozzles, such as 58 extending downwardly from the roof section 50a of the tubular frame 50.

However, this embodiment substantially differs from the one shown in Figures 1–3 through the arrangement of the lateral nozzle sets which are presently two in number on each side of the vehicle to be washed.

More particularly, from a point situated about midheight of each lateral section 50b, 50c, respectively a short tubular fitting 60 is supported having rotatably mounted thereon a hollow hub 61. The hubs 61 each support and have securely fixed thereto three tubular radial arms 62 which are fed with water from their respective lateral section through its associated hub 61. I ascertained that, in order to obtain a satisfactory effect, it will be sufficient for each of the arms 62 to be provided with one nozzle 63 only arranged at the end of its respective arm inclined towards the axis of rotation of the hub, so that its direction has a peripheral component, whereby the sets 61—63 each spontaneously rotate on supplying pressure water thereto, as I have explained in greater detail with reference to the set 55—57. The sets 61—63 rotate in vertical planes both parallel with the direction of movement of the vehicle along the tunnel, this direction being perpendicular to the plane of Figure 8.

Two further rotatable sets of nozzles 66—68 are each provided below the sets 61—63, respectively, the hubs of said further sets being supported by their associated lateral section 50b, 50c, respectively, through a tubular fitting 65. This tubular fitting is contained in the same vertical plane V extending through tubular fitting 60 (Figure 9), said vertical plane being common to all the axes of rotation of all the lateral sets shown in Figure 8. However, the axes of rotation of the sets 66—68 are inclined in this plane in an upward direction towards the tunnel inside, whereby the points of intersection of all said axes are situated within the tunnel, as diagrammatically indicated by a chain line in Figure 8. The planes of rotation of the sets 66—68 are therefore still parallel with the direction of movement of the vehicle, but are no longer vertical and converge downwardly. The sets 66—68 are each substantially similar to the sets 61—63 and comprise a rotatable hollow hub 66, tubular radial arms 67 and an inclined nozzle 68 at the end region of each arm 67. However, in order to attain a particularly advantageous washing effect, I have ascertained that this arrangement should meet certain further requirements.

Firstly, looking in the direction of the common axis of the two lateral sets 61—63 the surfaces described by said sets on rotation should partly overlap the surfaces described by sets 66—68. This condition is shown in Figure 9, in which it will be seen that the circle $C_1$ circumscribing the set 61—63 substantially intersects the projection of the circle $C_2$ which circumscribes the set 66—68, inasmuch as the arms 62 of the sets 61—63 are each capable of taking a position in which their end extends in close proximity to the hub 66 of the set 66—68. At the same time the hub 66 is approximately at the height of the axle M of the vehicle to be washed (Figure 10). The position of the hub 66 being thus defined, the length of each of the arms 62 is also defined. However, the arms 67 are shorter, as they should be confined within the limits defined by the sections 50c and 50d of the tubular frame. Generally, their length is of the order of 1.2 up to 1.4 times the maximum radius of the wheels of the vehicle to be washed. The axis of rotation of each set 66—68 is inclined with respect to the horizontal through an angle $\gamma$ ranging between 15 and 25°, preferably about 20° so that the plane of rotation of the set is likewise inclined through about 20° with respect to the vertical. Finally, the last requirement is that, one of the nozzles 63 and one of the nozzles 68 having taken their lowermost position, the projections of the axes of said nozzles on the cross sectional tunnel area (Fig. 10) should intersect above the adjacent guide, such as 52″, substantially at the top of the wheel 70 of the vehicle positioned in front of the two sets. Without any reference to the vehicle, this condition can be better defined by the values of the angles of inclination of the nozzles on the plane on Figure 10 which is a vertical plane extending transversely of the tunnel length. So, the angle $\alpha$, which is the projection on the plane of the figure of the angle confined by the axis of the nozzle 63 and its plane of rotation, should amount to 50–70°, and the angle $\beta$, which is the projection on the plane of the figure of the angle confined by the axis of the nozzle 68 and its plane of rotation should amount to 45–60°. It is further noted that the plane of the figure is parallel with the axial plane common to all sets 61—63 and 66—68, so that all projections can be referred to said common plane. It should be noted that the last mentioned requirement also applies to the embodiment shown in Figures 1 and 2, where the nozzles such as 23a are inclined towards their respective axes of rotation through an angle, the projection of which on the plane of the drawing is indicated by $\alpha$.

It is understood that in both above described embodiment suitable control means is provided for adjusting the flow and pressure of water supplied to the various sets of nozzles and the rate of feed of the vehicle along the tunnel.

In the numerous tests carried out I ascertained that in respect of washing of motor busses the arrangement described with reference to Figures 8–10 affords high concentrations of water flows to the regions situated beneath the vehicle wings 71, which are hardly accessible in all plants known heretofore, whereby a thorough washing with a reduction in power consumption of about 40% is afforded.

It will be obvious that certain details of my invention can be modified to suit circumstances within the limits of technical equivalents, the scope of the invention being defined by the appended claims.

What I claim is:

1. Automatic automobile washing plant comprising, in combination, means defining a tunnel, longitudinal guides in said tunnel for the vehicles to be washed, automatic hydraulic-jet rotatable nozzle sets arranged in said tunnel at opposite lateral walls of the latter and rotatable in planes substantially parallel with the direction of movement of the vehicle and each nozzle set being rotatable in a circle, at least some of the nozzles of each hydraulic-jet rotatable set being directed in a direction inclined at a selected angle to its plane of rotation and towards its axis of rotation and an associated vehicle surface to direct jets of water toward said vehicle surface at a selected angle and to rotate said nozzle sets each in a given direction at a selected velocity by reaction of said jets, and means for effecting a relative translation movement of the vehicle and said hydraulic-jet rotatable nozzle sets for causing the water jets from a set to impinge on the entire surface of the associated surface it washes during rotation of said set and for each water jet to impinge thereon only on its associated positions of said surface first in one direction and subsequently from substantially an opposite direction.

2. Automatic automobile washing plant according to claim 1, in which said automatic hydraulic-jet rotatable nozzle sets comprise a tubular annular carrier provided with a tubular annulus, a central hub connected with pressure water piping and radial conduits for supplying the annulus with water under pressure from said hub, and in which said nozzles are directed in a direction corresponding to a plane enclosing an angle of between 50 to 70 degrees in conjunction with said plane of rotation.

3. Automatic automobile washing plant comprising in combination, means defining a tunnel, a U-shaped guide for two vehicle wheels, a guide in the form of a metal plate for the other two vehicle wheels, the metal plate and bottom of the U-shaped guide being arranged in the same horizontal plane spaced from the floor of said tunnel, a chain conveyor parallel with said U-shaped guide for feeding the vehicle within the tunnel, a hydraulic-jet rotatable nozzle set arranged in a horizontal plane under the first mentioned horizontal plane and rotatably mounted on a projection of said floor, a hydraulic-jet rotatable nozzle set rotatably mounted on each side wall of said tunnel, a fourth hydraulic-jet rotatable nozzle set rotatably mounted on the ceiling of said tunnel, the nozzles of hydraulic-jet rotatable nozzle sets being directed towards the adjacent vehicle surfaces, a discharge conduit in the floor of said tunnel for discharging the washing water, each nozzle set being rotatable in a plane of rotation substantially parallel with the direction of movement of the vehicle and each nozzle set being rotatable in said plane of rotation in a circle having a diameter substantially as large as an associated vehicle surface to be washed by a given set, at least some of the nozzles of each hydraulic-jet rotatable set being directed in a direction inclined at a selected angle to its plane of rotation and towards a plane corresponding to its axis of rotation and an associated vehicle surface to direct jets of water toward said vehicle surface at a selected angle and to rotate said nozzle sets in one given direction at a selected velocity by reaction of said jets, and said conveyor being adapted to effect a relative translation movement of the vehicle and said hydraulic-jet rotatable nozzle sets for causing the water jets from a set to impinge on the entire surface of the associated surface it washes during rotation of said set and for each of said water jets to impinge thereon on associated surface portions first in one direction and subsequently from substantially opposite directions.

4. Automatic automobile washing plant comprising in combination, means defining an open-ended tunnel, longitudinal tracks in said tunnel for supporting vehicles to be washed, a plurality of rotatable nozzle carriers each rotatable in a given plane and disposed in said tunnel adjacent the tunnel walls, nozzles carried by said carriers and directed inwardly toward an associated vehicle surface to direct jets of water toward said surface, means for supplying water under pressure to said nozzles, at least some of said nozzles being inclined at a selected angle to the plane of rotation to exert a reaction force for rotating said carriers at a predetermined velocity, said carriers being rotatable in fixed planes parallel to the axis of said tunnel and including carriers rotatable in a substantially vertical plane and having a diameter of the order of the height of vehicles to be washed and a carrier rotatable in a horizontal plane and having a diameter of the order of the width of said vehicles, means for effecting relative longitudinal movement of said tunnel and a vehicle supported by said tracks and for effecting a relative translation movement of the vehicle and carriers for causing the water jets from a carrier to impinge on the entire surface of the associated surface it washes during rotation of said carrier and for each water jet to impinge thereon only on its associated portions of said surface first in one direction and subsequently from substantially an opposite direction.

5. Automatic automobile washing plant comprising, in combination, means defining a tunnel, longitudinal guides in said tunnel for the vehicles to be washed, automatic hydraulic-jet rotatable nozzle annular carriers arranged in said tunnel and rotatable in planes substantially parallel with the direction of movement of the vehicle and each carrier having a diameter substantially as large as an associated vehicle surface to be washed by a given carrier, at least some of the nozzles of each hydraulic-jet rotatable carrier being directed in a direction inclined at a selected angle to its plane of rotation and towards a plane corresponding to its axis of rotation and towards an associated vehicle surface to direct jets of water toward said vehicle surface at a selected angle and to rotate said carriers each in a given direction at a selected velocity by reaction of said jets, one each of said carriers mounted in vertical planes on opposite sides of the tunnel for washing the side surfaces of a vehicle and a pair of other similar carriers of lesser diameter each mounted to rotate in a plane inclined at a given angle to the vertical planes of said side-washing carriers and disposed to cooperate with the carriers mounted on opposite sides of the tunnel in washing edge portions of the underside of the car and disposed substantially for washing the vehicle wheels.

6. Automatic automobile washing plant according to claim 5, in which the rotatable carriers on opposite sides of the tunnel are each associated one each of said pair of rotatable carriers of lesser diameter and the axes of rotation of each carrier disposed on the side of the tunnel and its associated carrier of lesser diameter being disposed in a common vertical plane, and in which the axis of rotation of said pair of carriers of lesser diameter is directed in an upwardly direction and the plane of rotation of each of said pair of carriers is inclined from the horizontal at an angle between about 15 degrees and 25 degrees.

7. Automatic automobile washing plant according to claim 6, in which the diameter of said pair of carriers is about .4 to .8 larger than the maximum diameter of the wheels of the vehicle to be washed.

References Cited in the file of this patent

UNITED STATES PATENTS

| | | |
|---|---|---|
| 1,613,213 | Wilde | Jan. 4, 1927 |
| 1,752,316 | Voshardt | Apr. 1, 1930 |
| 2,602,003 | Wellborn | July 1, 1952 |
| 2,660,744 | Cockrell | Dec. 1, 1953 |

FOREIGN PATENTS

| | | |
|---|---|---|
| 509,564 | Great Britain | July 18, 1939 |